(12) United States Patent
Lazzarini et al.

(10) Patent No.: US 12,178,335 B2
(45) Date of Patent: Dec. 31, 2024

(54) DISPLAY COUNTER FOR MAKING AND KEEPING LIQUID OR SEMI-LIQUID FOOD PRODUCTS

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 912 days.

(21) Appl. No.: 17/307,479

(22) Filed: May 4, 2021

(65) Prior Publication Data

US 2021/0361081 A1    Nov. 25, 2021

(30) Foreign Application Priority Data

May 19, 2020    (IT) ........................ 202020000002638

(51) Int. Cl.
*A47F 3/04*    (2006.01)
*A23G 9/22*    (2006.01)
*A47J 43/046*    (2006.01)

(52) U.S. Cl.
CPC ............ *A47F 3/0469* (2013.01); *A23G 9/227* (2013.01); *A47J 43/046* (2013.01); *A47F 2003/0473* (2013.01)

(58) Field of Classification Search
CPC ...... A47J 43/06; A47J 43/046; A47J 2003/04; A23G 9/225; A23G 9/227; A47F 3/0469; A47F 2003/0473
See application file for complete search history.

(56) References Cited

U.S. PATENT DOCUMENTS

| | | | |
|---|---|---|---|
| 2011/0217440 A1* | 9/2011 | Grotti ....................... | A23G 9/04 99/485 |
| 2013/0269381 A1* | 10/2013 | Cocchi ................... | A23G 9/045 62/246 |
| 2015/0096322 A1* | 4/2015 | Cocchi ..................... | A23G 9/28 62/238.7 |
| 2019/0069573 A1* | 3/2019 | Cocchi ..................... | A23G 9/22 |

* cited by examiner

*Primary Examiner* — Brian W Jennison
(74) *Attorney, Agent, or Firm* — SHUTTLEWORTH & INGERSOLL, PLC; Timothy J. Klima

(57) ABSTRACT

A display counter for making and keeping liquid or semi-liquid food products is characterized in that it is made up of a plurality of modules, each defining at least one product processing position and adapted to be connectable to each other in a plurality of configurations and combinations so that the display counter can adopt a plurality of operational compositions.

17 Claims, 3 Drawing Sheets

DISPLAY COUNTER FOR MAKING AND KEEPING LIQUID OR SEMI-LIQUID FOOD PRODUCTS

This application claims priority to Italian Patent Application 202020000002638 filed May 19, 2020, the entirety of which is incorporated by reference herein.

BACKGROUND OF THE INVENTION

This invention relates to a display counter for making and keeping liquid and semi-liquid products of the sector of ice cream (gelato, sorbets, soft-serve ice cream, etc.), bakery and confectionery (custard and chocolate, etc.) or catering (savory soups, etc.).

As is known, a need which is strongly felt in this sector is that of being able to make a plurality of products in small portions very quickly and to a customer's individual request.

In particular, one need which is felt particularly strongly in the trade is that of making liquid or semi-liquid food products instantly, while the customer waits.

Another need that is felt particularly strongly by machine manufacturers is that of being able to provide a machine that is particularly versatile in terms of product quantities and variability.

Another need that is felt particularly strongly by machine manufacturers is that of being able to provide a machine whose investment cost is limited and commensurate with the needs of the market in which the machine operates.

Yet another need felt by machine manufacturers is that of providing a machine that can be used in a plurality of different situations, corresponding to different needs of operators in the trade, and that is capable of optimizing available space.

SUMMARY OF THE INVENTION

The aim of this disclosure is to provide a display counter for making and keeping liquid and semi-liquid food products, which allows meeting the above mentioned needs and, more specifically, a display counter for making and keeping liquid and semi-liquid food products which allows making small quantities of products of the ice cream, bakery and confectionery or catering sector particularly easily based on the requirements expressed on the spot by the customer.

Another aim of the disclosure is to provide a display counter for making and keeping liquid and semi-liquid food products of the ice cream, bakery and confectionery or catering sector and capable of optimizing investment costs.

Also an aim of the disclosure is to provide a display counter for making and keeping liquid and semi-liquid food products of the ice cream, bakery and confectionery or catering sector and capable of optimizing the space available in the place where the display counter is installed.

According to the disclosure, these aims are achieved by a display counter for making and keeping liquid and semi-liquid food products of the ice cream, bakery and confectionery or catering sector and comprising the technical features set out in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate one or more embodiments purely by way of example, and in which:

DESCRIPTION OF THE PREFERRED EMBODIMENTS

Figure 1:
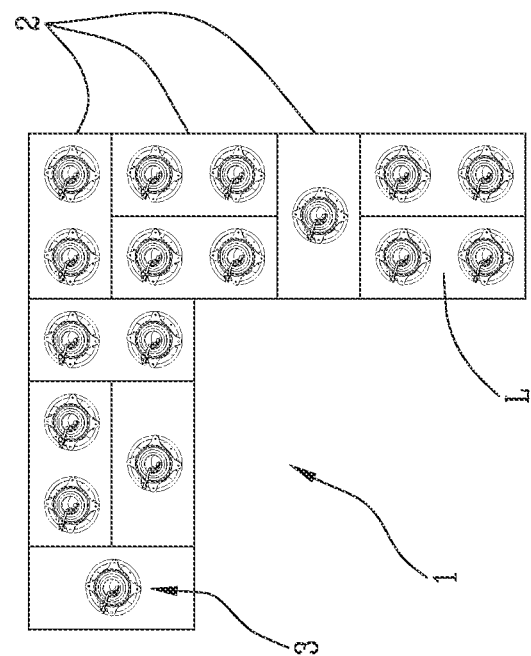
FIG. 1 shows a schematic view of an embodiment of a display counter according to this disclosure.

With reference to the accompanying drawings, the numeral 1 denotes a display counter for making and keeping liquid or semi-liquid food products of the ice cream, bakery and confectionery or catering sector.

The display counter 1 is preferably designed to itself make and store ice cream or bakery and confectionery or catering products for a predetermined length of time.

Products of the ice cream, bakery and confectionery or catering trade means products such as ice creams (soft-serve, artisan gelato, sorbets, granitas etc.) or products such as custard, chocolate, or soups.

These products may be hot or cold, without distinction.

The description which follows is of a display counter 1 for ice cream, suitable in particular for making and keeping artisan gelato; the disclosure can, however, be extended without any limitation, since the concept at the base of disclosure can be applied equally to any type of liquid or semi-liquid food products.

In this context, the term "ice cream" is used to mean a food preparation which is based on milk or milk-derived products and to which fruit, aromatics or other ingredients are added to obtain different flavors. In this situation, the display counter 1 is used to process these ingredients to make the required ice cream.

According to a first aspect of the disclosure, the display counter 1 is made up of a plurality of modules 2, each defining at least one product processing position 3 and adapted to be connectable to each other in a plurality of configurations and combinations so that the display counter 1 can adopt a plurality of operational compositions.

In this description, the term "processing position" is used to denote a portion of the module 2 specifically designed and operationally intended for processing the product.

In other words, it is possible to vary the number and/or the mutual positions of the modules 2 making up the display counter 1 in its entirety, thereby varying the number, position and distribution of the processing position 3.

It follows, therefore, that varying the number of processing positions 3 allows varying the total quantity of product processed by the display counter 1 and increasing the range of products made and kept by the display counter 1.

Advantageously, it is also possible to adapt the display counter 1 to operators' requirements.

For example, operators can purchase the number of modules 2 to suit their needs, based on market and/or customer requirements. Modules 2 can be added/removed at any time should such requirements change or should the product range be varied.

Moreover, an operator with limited purchasing power can choose to invest in a display cabinet 1 with a small number of modules and defer the purchasing of additional modules to a later time.

Preferably, the modules 2 are adapted to be connectable to each other in such a way that the display counter 1 can adopt operational compositions of different shapes and sizes.

Advantageously, therefore, the operator can configure or make up the display counter 1 to suit the place where the display counter 1 is to be installed.

Thus, by varying the shape and/or size of the display counter 1, the operator can optimize the available space and/or adapt the display counter 1 to meet aesthetic and stylistic requirements.

Figure 2:
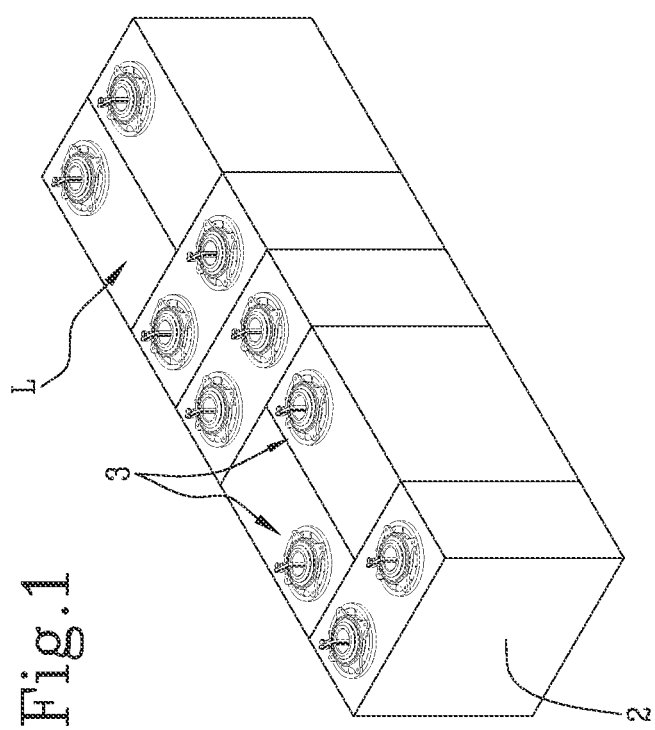
FIG. 2 shows a schematic view of a further embodiment of the display counter according to this disclosure.

By way of non-limiting example, FIG. 1 and FIG. 2 show two possible embodiments of the display counter 1: a linear and an angular, or L-shaped configuration, respectively.

Preferably, along the direction of longitudinal extension of the display counter 1, the modules 2 may be disposed differently longitudinally and/or transversely and with a different number of processing positions 3.

Each module 2 has a top wall 7 where at least one processing position 3 is located and which can define a supporting or work surface.

According to an advantageous aspect, the top walls 7 of the plurality of modules 2 are co-planar and, in their entirety, define a substantially uninterrupted work top L when the modules 2 are connected to each other.

In other words, the work top L is the part of the display counter 1 where the processing positions 3 are disposed and thus, where work on the products is carried out. Depending on the configurations and operational compositions adopted by the display counter 1, the work top L will have a given structure.

Generally speaking, the work top L may adopt any structure, defined by the operational composition of the display counter 1 as a function of the configurations and combinations of the modules 2 in relation to each other.

According to an aspect of this disclosure, all the modules 2 of the plurality of modules 2 preferably have the same shape in plan.

Figure 3A:
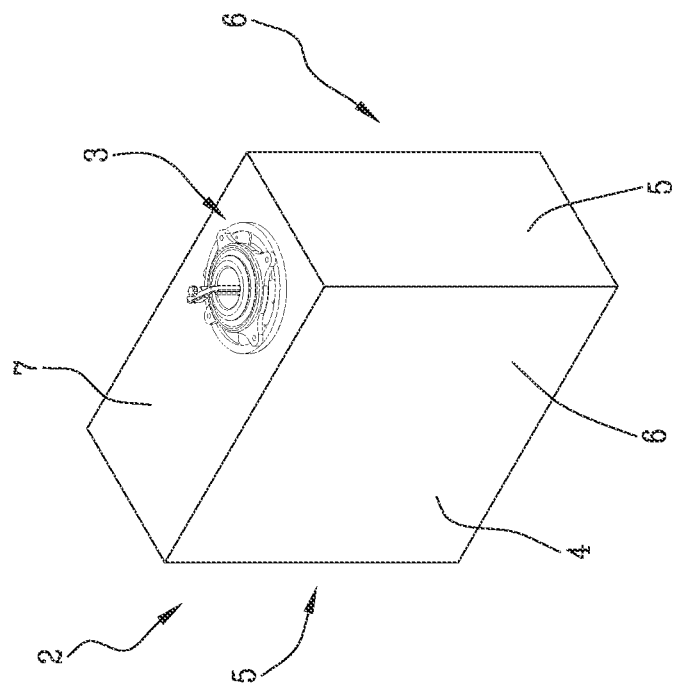
FIGS. 3A-3B show two schematic perspective views of respective embodiments of a component of the display counter of FIG. 1.
Figure 3B:
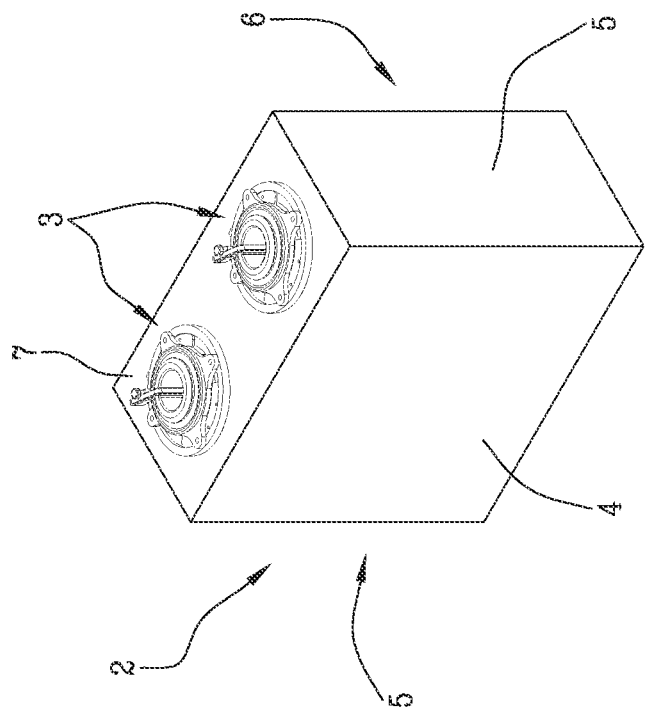

The shape in plan is preferably polygonal, and still more preferably, rectangular, as illustrated in FIGS. 3A-3B, which show two preferred embodiments of the modules 2 by way of non-limiting example.

Also possible are other embodiments where the shape in plan is square.

In a possible embodiment of this invention, all the modules 2 of the plurality of modules 2 are identical.

In other words, all the modules 2 making up the display counter 1 are provided with an identical frame 4, having the same shape in plan and the same number of processing positions 3.

In other embodiments, however, the display counter 1 comprises a plurality of modules 2 which are not identical in at least one of the aspects mentioned above.

For example, in some embodiments, the display counter 1 may be made up of different modules 2, for example, identical in structure but having a different number of processing positions 3, as illustrated in FIGS. 3A and 3B which show, respectively, a module 2 having two processing positions 3 and a module 2 having one processing position 3, or having a different shape (for example, using modules that are square in plan and modules that are rectangular in plan).

According to a preferred aspect of the disclosure, each module 2 has a plurality of side walls, where at least some of the side walls, preferably all of them, are provided with fastening means (not illustrated in the accompanying drawings).

These fastening means are configured to securely and reversibly fasten respective side walls of adjacent modules 2.

These fastening means may be of any kind, provided they are suitable for securely and releasably connecting adjacent modules 2 to each other.

Preferably, according to a non-exhaustive list, the fastening means may comprise at least one of the following: one or more threaded elements, one or more lever-operated tightening elements, one or more snap fasteners.

Through these fastening means, the modules 2 can be connected to each other by juxtaposing corresponding side walls in parallel where, preferably, the side walls of each module comprise a first pair 5 of side walls, which are parallel to each other, and a second pair 6 of side walls, which are parallel to each other and perpendicular to the first pair 5 of side walls.

Still more preferably, the side walls of the second pair 6 may have a length that is a multiple of the length of the side walls of the first pair 5, in particular in applications where the modules have a rectangular shape in plan.

More specifically, the side walls of the second pair 6 may define two or more distinct connecting areas for joining a corresponding side wall of a first pair 5 of side walls of an adjacent module 2 in such a way as to define two different configurations for fastening the adjacent modules 2 to each other. This is particularly useful when using modules whose shape in plan is rectangular, where disposing adjacent modules perpendicularly to each other results in two or more possible fastening configurations.

In other words, two or more modules 2 can be joined and fastened to each other by the respective first and/or second pairs 5, 6 of side walls.

Advantageously, it is thus possible to obtain a plurality of different configurations and/or operational compositions which are, moreover, particularly stable.

For example, as illustrated in the embodiments of FIGS. 1 and 2, the modules 2 can be connected in such a way that the respective second pair 6 of walls is oriented in parallel and/or transversely to a main direction of extension of the work top L.

More specifically, the modules 2 have a second pair 6 of side walls which are preferably twice as long as the first pair 5 of side walls. That way, one of the side walls of the second pair 6 of one module 2, disposed transversely to the main direction of extension of the work top L, can be connected to side walls of the first pair 5 of side walls of two respective adjacent modules 2.

Structurally, in a preferred embodiment, each module 2 essentially comprises a thermal system 8, at least one processing container 12, at least one stirrer 14 and a motor M.

More specifically, the thermal system 8 performs at least one thermodynamic cycle through a main heat exchanger fluid and is provided with a compressor 9, a main heat exchanger 10 and a pressure reducing element 11, preferably a throttling element, all having the main heat exchanger fluid flowing through them.

The thermal system 8 is preferably, but not exclusively, configured to perform a refrigerating cycle.

At a functional level, the thermal system 8 operates on the at least one processing container 12, where the at least one processing container 12 defines a processing chamber 13 to make a liquid or semi-liquid food product.

The at least one stirrer 14 is applied or applicable on the frame 4 and is mounted or mountable in a respective processing container 12 to define, together therewith, a processing position 3.

Preferably, the modules 2 comprise one or two processing containers 12 and one or two stirrers 14, associated with a respective container 12 to define, together therewith, one or two processing positions 3.

More specifically, in the embodiment of FIG. 3A, the module 2 has two processing containers 12, juxtaposed with each other along a direction parallel to a main horizontal direction of extension of the module 2, and two stirrers 14, defining, together with the two processing containers 12, two processing positions 3.

In the embodiment of FIG. 3B, the module 2 has one processing container 12 and one stirrer 14, defining a single processing position 3.

Lastly, the motor M is operatively associated with the at least one processing container 12 or with the at least one stirrer 14.

The modules 2 are therefore operatively independent of each other; in particular, they are configured to perform their functions of independently making and keeping their respective products.

Described below by way of non-limiting example are two embodiments of the modules 2.

Figure 4:
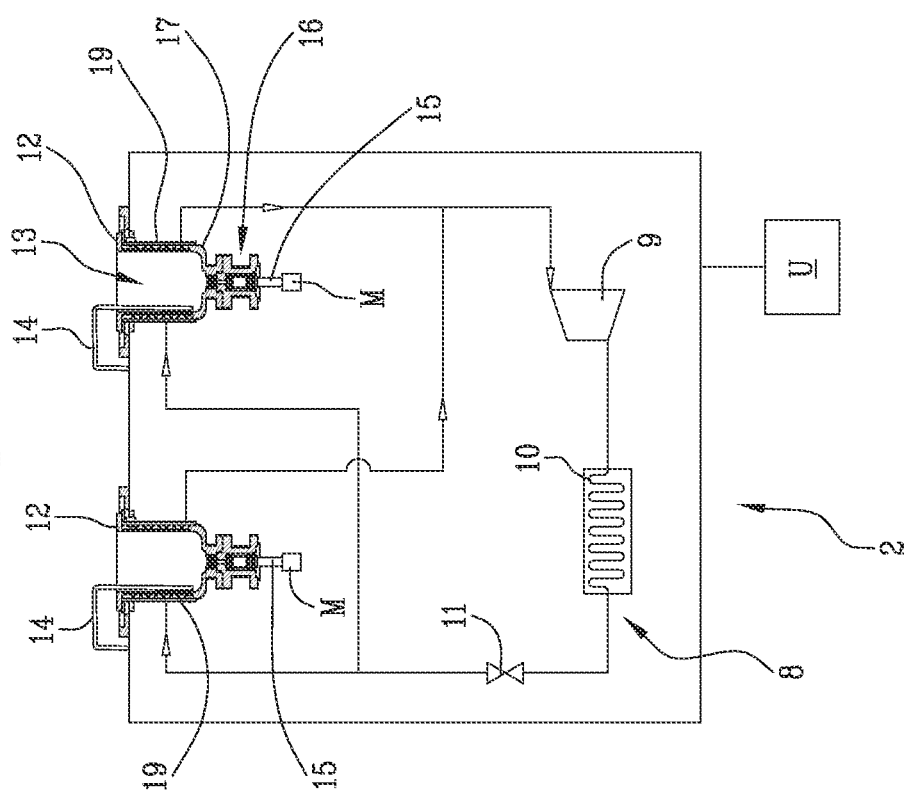
FIG. 4 shows a schematic view of an embodiment of the component of the display counter of FIG. 1.

In a first embodiment, illustrated schematically in FIG. 4, the motor M is provided with at least one drive shaft 15, adapted to rotate about a respective vertical axis of rotation X associated with a respective processing container 12 so that the at least one processing container 12 is movable in rotation about the respective axis of rotation X.

The stirrer 14, on the other hand, is applied or applicable on the frame 4 at a fixed position.

The module 2 also comprises coupling means 16 between the at least one processing container 12 and the respective drive shaft 15 to allow coupling the motor M to the at least one processing container 12, thus transmitting motion thereto.

In other words, in use, the stirrer 14 is attached to the frame 4 and the movement of the product relative to the stirrer 14 is induced by the rotation of the processing container 12.

Inside the processing container 12, the product is processed by the mechanical action by which the stirrer 14 mixes the product.

Also provided in this embodiment is a second container 17, fixed relative to the frame 4 and shaped to rotatably house a respective processing container 12.

The processing container 12 and the second container 17 are cylindrical and, in use, disposed coaxially.

The processing container 12 is removably mounted in the second container 17.

The second container 17 also defines a gap, located between the second container 17 itself and the processing container 12 and fillable with a secondary heat exchanger fluid.

The module 2 also comprises at least a second heat exchanger 19 which is associated with a respective second container 17 and in which the main heat exchanger fluid circulates.

Preferably, the second heat exchanger 19 is in the form of a coil which operates on the side walls of the second container 17.

Figure 5:
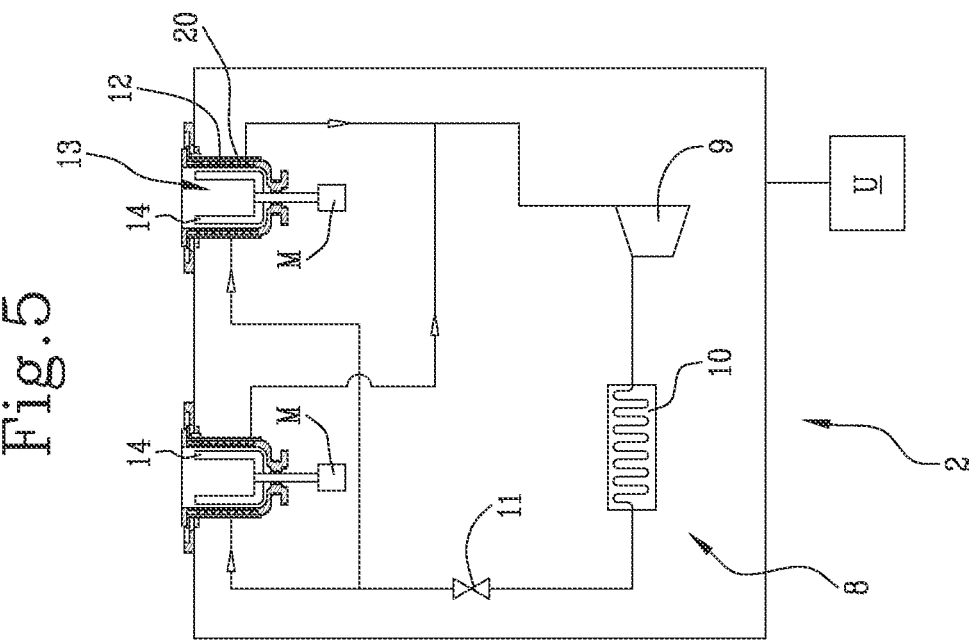
FIG. 5 shows a schematic view of a further embodiment of the component of the display counter FIG. 1.

In a second embodiment, illustrated by way of example in FIG. 5, the motor M is operatively associated with the at least one stirrer 14 in such a way that the stirrer 14 can perform a revolving movement inside the respective processing container 12 which, in use, is fixed relative to the frame 4.

Preferably, the revolving movement has a circular trajectory.

In other words, in use, the processing container 12 is attached to the frame 4 and the product is moved and mixed by the stirrer 14, which is in turn driven by the motor M.

In an alternative embodiment, the stirrer 14 is applied or applicable on the frame 4 at a fixed position and fitted or fittable in the processing container 12.

In other words, in use, in this alternative embodiment, the stirrer 14 is attached to the frame and the movement of the product relative to the stirrer 14 is induced by the rotation of the container 12 itself.

In this embodiment, there is a third heat exchanger 20 for each processing container 12.

Preferably, the third heat exchanger 20 is in the form of a coil which operates especially on the lateral surface of the processing container 12.

Preferably, also, when there is more than one processing container 12, the third heat exchangers 20 are operatively disposed in parallel.

According to a further aspect of the disclosure, the display counter 1 comprises a control unit U configured to manage the modules 2 of the plurality of modules 2 independently.

Advantageously, this makes the display counter 1 efficient and optimizes its energy cost.

In effect, the control unit U makes it possible to precisely manage each module 2, enabling or disabling the respective motors M and/or the respective thermal systems 8 according to requirements.

Advantageously, the display counter 1 described herein overcomes the disadvantages of the prior art in that it is capable of optimizing production volumes and investment costs.

This result is obtained thanks to the modular structure of the display counter 1, where the modules 2 making it up can be connected or disconnected as required.

Consequently, the operator can use any desired number of modules 2 and can vary that number at any time.

Advantageously, also, the display counter 1 described herein overcomes the disadvantages of the prior art in that it is capable of optimizing the shop space in which the display counter 1 is installed.

This result is obtained thanks to the possibility of changing the configuration and/or the composition of the display counter itself into a plurality of operational configurations.

More specifically, this result is obtained thanks to the possibility of joining two or more modules 2 to each other by respective first and/or second pairs of side walls.

What is claimed is:

1. A display counter for making and keeping liquid or semi-liquid food products, the display counter comprising:
   a plurality of modules,
   wherein each module of the plurality of modules comprises:
   a thermal system for performing at least one thermodynamic cycle using a main heat exchanger fluid and including a compressor, a main heat exchanger and a pressure reducing element, all affected by circulation of the main heat exchanger fluid;
   at least one processing container, defining a processing chamber to make a liquid or semi-liquid food product, the thermal system operating on the at least one processing container;

at least one stirrer, applied or applicable on a frame of the module and fitted or fittable in a respective processing container of the at least one processing container; a processing position being defined by the respective processing container together with the respective stirrer;

a motor operatively connected with the at least one processing container or with the at least one stirrer, the modules being adapted to be connected to each other in a plurality of configurations and combinations so that the display counter can adopt a plurality of operational compositions;

wherein each module has a plurality of side walls and wherein at least some of the side walls of each module are provided with a fastening device for securely and reversibly fastening respective side walls of adjacent modules;

wherein the modules are connected to each other by juxtaposing corresponding side walls in parallel and wherein the side walls of each module comprise a first pair of side walls, which are parallel to each other, and a second pair of side walls, which are parallel to each other and perpendicular to the first pair of side walls; and wherein the second pair of side walls have a length that is a multiple of a length of the first pair of side walls.

2. The display counter according to claim 1, wherein the modules are adapted to be connected to each other such that the display counter has operational compositions of different shapes and/or sizes.

3. The display counter according to claim 2, wherein each module has a top wall where the at least one processing position is located; the top walls of the plurality of modules being co-planar and, in their entirety, defining a substantially uninterrupted work top when the modules are connected to each other.

4. The display counter according to claim 1, wherein all the modules of the plurality of modules have a same shape in plan.

5. The display counter according to claim 1, wherein all the modules of the plurality of modules are identical.

6. The display counter according to claim 1, wherein each module has a polygonal shape in plan.

7. The display counter according to claim 1, wherein the fastening device comprises one or more threaded elements.

8. The display counter according to claim 1, wherein the fastening device comprises one or more lever-operated tightening elements.

9. The display counter according to claim 1, wherein the fastening device comprises one or more snap fasteners.

10. The display counter according to claim 1, wherein the second pair of side walls define two or more distinct connecting areas for joining to a corresponding side wall of the first pair of side walls of an adjacent module to define two different configurations for fastening the adjacent modules to each other.

11. The display counter according to claim 1, wherein each module comprises two processing containers of the at least one processing container and two stirrers of the at least one stirrer together defining two respective processing positions.

12. The display counter according to claim 11, wherein the two processing containers are juxtaposed with each other along a direction parallel to a main horizontal direction of extension of the module.

13. The display counter according to claim 1, wherein the motor is includes at least one drive shaft, adapted to rotate about a respective vertical axis of rotation of the at least one processing container so that the at least one processing container is movable in rotation about the respective vertical axis of rotation, and wherein the at least one stirrer is applied or applicable on the frame at a fixed position;

the each module comprising a coupling device between the at least one processing container and the at least one drive shaft to allow coupling the motor to the at least one processing container, thus transmitting motion thereto.

14. The display counter according to claim 1, wherein the motor is operatively connected with the at least one stirrer such that the at least one stirrer performs a revolving movement inside the at least one processing container, and wherein the at least one processing container is, in use, fixed relative to the frame; the revolving movement having a circular trajectory.

15. The display counter, according to claim 1, and further comprising a control unit configured to independently manage the modules of the plurality of modules.

16. The display counter according to claim 6, wherein the polygonal shape is rectangular or square.

17. The display counter according to claim 1, wherein all of the side walls of each module are provided with the fastening device.

* * * * *